UNITED STATES PATENT OFFICE 2,653,920

MOLDED ARTICLES COMPRISING A FURFURYL ALCOHOL RESIN AND A MIXTURE OF FILLERS OF DIFFERENT MESH SIZES

Charles G. Harford, Quincy, Mass., assignor to Arthur D. Little, Inc., Cambridge, Mass., a corporation of Massachusetts No Drawing. Application August 2, 1949, Serial No. 108,231

15 Claims. (Cl. 260—28.5)

This invention relates to the preparation of dense, chemically and thermally resistant structures and more particularly to the preparation of resin-rock aggregate structures.

One of the principal uses for such structures is for laboratory furniture, such as bench tops. In the past, various materials have been used for bench tops including soapstone, resin impregnated sandstone, cement-asbestos boards, and resin-asbestos boards. Soapstone and asbestos mixtures are expensive, while resin impregnated sandstone is not satisfactorily resistant to thermal shock.

It is an object of this invention to produce dense, chemically and thermally resistant structures.

A further object is to produce such structures economically.

These and other objects are obtained by the following procedure:

Mineral material is reduced in particle size so that it all passes through a 16-mesh screen, mixed with furfuryl alcohol resin, molded to the desired shape and cured.

The mineral material or filler of which soapstone, sand, slate, and pyrophyllite are good examples, must be relatively inert to acids, alkalies, salts and organic solvents. The particle size of the filler should vary from relatively fine material up to that which will pass through about a 16-mesh screen or a maximum diameter of about .04 inch.

The resin employed is furfuryl alcohol resin polymerized to the first stage only. At this point the resin is a mobile, easily workable material. If desired, up to 15% furfuryl may be included with the furfuryl alcohol resin but incorporation of furfural tends to make the product brittle.

A catalyst such as ferric chloride, boron trifluoride or sulfuric acid may be employed, but it is a feature of this invention that a chlorinated hydrocarbon, and chlorinated paraffin in particular, is a most suitable catalyst for curing my composition.

The resin, mineral filler, and catalyst are pressed into the desired form, such as a bench top, and heated to cure the resin. Two alternative methods may be employed. The mixture may be pressed cold and subsequently heated, or heat may be applied at the same time the pressure is applied. The former method has the advantage of requiring a less expensive press, while the latter method requires less time. Both methods yield satisfactory and substantially identical products.

One of the particular advantages of my process is that the major proportion of the finished product is relatively inexpensive and readily available mineral material. Ground slate is the preferred mineral, and is best prepared from otherwise waste material. The slate is reduced in any conventional manner as by grinding to the extent that all the slate will pass through a 16-mesh screen. While the percentage of any particular particle size in relation to the whole will vary somewhat depending upon the particular slate, or other mineral material employed, it has been found that variations in particle size occur from very fine up to a size which just passes through a 16-mesh screen. Moreover, it has been found that to obtain a satisfactory product it is advisable that there be a wide variation in particle size distribution for it is believed that such distribution gives a natural dense packing of the mineral matter. Thus it may be said that the mineral matter should have a particle size distribution tending to give a maximum density but having no substantial amount of the material greater than 16-mesh in size. A typical particle size distribution of ground slate is given in the table below:

| Passes through | Will not pass through— | Wgt., gms. | Percent by wt. |
|---|---|---|---|
| 16 mesh | 20 mesh | 210 | 17.5 |
| 20 mesh | 40 mesh | 525 | 43.8 |
| 40 mesh | 60 mesh | 160 | 13.3 |
| 60 mesh | 80 mesh | 290 | 24.2 |
| 80 mesh | 100 mesh | 5 | 0.4 |
| 100 mesh |  | 10 |  |
|  |  | 1,200 | 100.0 |

It has been further found that it is advisable to add to the ground material at least 25% and preferably from 60 to 80% by weight of slate flour, or other similarly finely divided acceptable mineral material. Slate flour is slate ground fine enough so that at least 95% will pass through a 200-mesh screen.

It will be seen that if 70% by weight of slate flour based on the ground slate is added to a slate composition as shown above in the table, the mix will consist of 1200 grams of ground slate and 840 grams of slate flour.

It is to be noted that the most expensive ingredient is the resin employed. It is therefore desirable to keep the resin as low as possible without sacrificing any required characteristics of the finished product. While the introduction of slate flour fills voids present in the larger aggregates, an excessive amount of slate flour requires excessive quantities of resin. Thus it is essential, for commercial reasons, that the slate flour (or other similarly finely divided and added material) not exceed equal parts by weight of the mineral aggregate to which it is added.

The aggregates employed must be substantially free from acid reactive impurities and such reactive materials as calcium carbonate, magnesium carbonate, etc. In general they should contain not more than 4% material soluble in any solvent (except hydrofluoric acid).

The resin which has proved to be a satisfactory bonding agent having the most satisfactory chemical and thermal shock resistance, is that prepared from furfuryl alcohol using chlorinated paraffin as the catalyst. While the precise amount of resin which may be employed to obtain optimum results varies somewhat with the proportion of the most finely divided filler material, and with the particular filler material employed, at least 6% by weight on the total composition must be used to give proper bonding strength. If too much resin is employed, the resin spews out during the pressing operation. The upper limit is about 12% by weight of resin, although it is generally inadvisable to exceed 10%. If desired up to about 15% of the resin composition may be furfural.

The resin, as stated above, is thoroughly incorporated by mixing it with the aggregate by any suitable means. It is at this stage a mobile liquid largely linear in nature and upon heating cures to a solid infusible, insoluble resin. With the resin is included about 3% by weight of the total composition (although amounts up to 4 or even 5% may be employed) of chlorinated paraffin. In addition, if desired, one of the conventional catalysts such as boron trifluoride, ferric chloride, or sulfuric acid may be added.

One of two alternative methods may be followed, i. e. the cold process or the hot process.

By the cold process, the resin-filler mixture is compressed into the desired shape. Pressures of from about 2000 to about 3500 pounds per square inch have been found suitable. The exact pressure is not important but sufficient pressure must be exerted to fully compress the mixture. The "green" article is removed and "fired" at a temperature of from 125° F. to about 385° F. for from one to three or four hours. While the resin will cure in the lower part of the temperature range indicated, it has been found that there is a rapid increase in chemical resistance when curing is effected at temperatures above about 285° F. This effect while unexpected appears to be important when maximum resistance is required. The upper temperature is determined by the heat sensitivity of the resin.

By the hot process the press is heated as by high pressure steam. The resin-filler mixture is placed in the press formed by pressure and cured with heat in one step. An advantage of this method is that it is somewhat thicker and also it does not require handling a "green" molded piece. It has the disadvantage of involving a considerably higher equipment cost.

In order to understand my invention more fully the following examples are given:

*Example I*

Green slate was ground so that it all passed through a 16 mesh screen. A mixture having the following composition was then prepared:

| | | |
|---|---|---|
| Green slate | grams | 1170 |
| Slate flour | do | 832 |
| Chlorinated paraffin | do | 62 |
| Furfuryl alcohol resin (primary stage) | do | 220 |
| Boron trifluoride (2%) in ether | cc | 6 |

After the above materials were thoroughly mixed, the mixture was pressed at 2500 pounds per square inch, placed in an oven and heated at about 315° F. for 4½ hours. The resulting product was dense, non-porous, and resistant to heat and chemicals.

The above example illustrates a preferred form of the cold process.

*Example II*

Green slate was ground as before and made up into the following composition:

| | | |
|---|---|---|
| Green slate | grams | 1170 |
| Slate flour | do | 832 |
| Chlorinated paraffin | do | 62 |
| Furfuryl alcohol resin (primary stage) | do | 135 |
| Boron trifluoride (2%) in ether | cc | 6 |

The mixture was placed in a press and subjected to a pressure of 2500 pounds per square inch, and heated with steam at 110 pounds per square inch gauge, for several hours. The resulting product was very satisfactory.

Aside from having good impact resistance, tensile strength in excess of 500 pounds per square inch, and high compressive strength, the finished product must have less than 2% absorption in a twenty-four hour period of the following materials:

> Acetic anhydride
> Acetic acid
> Chlorinated solvents
> Methyl ethyl ketone
> 70% nitric acid
> 96% sulfuric acid
> 36% hydrochloric acid
> 30% sodium hydroxide It will be noted that chlorinated paraffin was employed as the principal catalyst in the above examples. It may be used either alone or in conjunction with known catalysts. Chlorinated paraffin is compatible with furfuryl alcohol resin and is easily incorporated and worked with that resin. A further advantage of chlorinated paraffin over some of the other catalysts is that it is not reactive until the temperature has been raised to 80° C.–90° C., thus permitting storage of the mix without danger of setting up over a period of time. A still further advantage of chlorinated paraffin is that it imparts additional chemical resistance to the product. This is not true of the other catalysts. The first stage of the polymerization is not conducted with chlorinated paraffin, but with the more conventional materials.

The products of this invention are inexpensive yet fully satisfactory structures where resistance to chemicals, heat, pressure, and sudden impacts are desirable. Such characteristics are particularly desirable for bench tops.

Having now described my invention, I claim:

1. A dense, chemically resistant structure consisting substantially entirely of a mineral filler, a cured resin and a catalyst, said mineral filler being composed of a chemically resistant mineral aggregate passing through a 16 mesh screen and being retained on a 100 mesh screen and from 25 to 80% by weight of said aggregate of chemically resistant mineral flour at least 95% of which passes through a 200 mesh screen, said resin being a furfuryl alcohol resin and being present in an amount of 6 to 12% based on the total weight of the composition.

2. A dense, chemically resistant structure consisting substantially entirely of a mineral filler, a cured resin and catalysts, said mineral filler being composed of a chemically resistant mineral aggregate passing through a 16 mesh screen and being retained on a 100 mesh screen and from 25 to 80% by weight of said aggregate of chemically resistant mineral flour at least 95% of which passes through a 200 mesh screen, said resin being a furfuryl alcohol resin in an amount of 6 to 12% based on the total weight of the composition, and chlorinated paraffin as a catalyst in addition to the first stage resin catalysts.

3. A dense chemically resistant structure according to claim 2 in which the resin is substantially a furfuryl alcohol resin containing not more than 15% furfural.

4. A dense, chemically resistant structure consisting substantially entirely of a mineral filler, a cured resin and catalysts, said mineral filler being ground slate passing through a 16 mesh screen and being retained on a 100 mesh screen and from 25 to 80% by weight of said ground slate in the form of slate flour, at least 95% of which passes through a 200 mesh screen, said resin being a furfuryl alcohol resin in an amount of 6 to 12%, based on the total weight of the composition, and chlorinated paraffin as a catalyst in addition to the first stage resin catalysts.

5. A dense chemically resistant structure according to claim 2 in which the mineral filler is sand.

6. A dense chemically resistant structure according to claim 2 in which the mineral filler is pyrophylite.

7. The method of producing a dense, chemically resistant structure which comprises the steps of mixing a chemically resistant mineral filler with 6 to 12% by weight of the total composition of a first stage furfuryl alcohol resin and a catalyst to form a mixture, molding said mixture under pressure and curing said mixture, said mineral filler being composed of a chemically resistant mineral aggregate passing through a 16 mesh screen and being retained on a 100 mesh screen and from 25 to 80% by weight of said aggregate of chemically resistant mineral flour at least 95% of which passes through a 200 mesh screen.

8. The method of producing a dense, chemically resistant structure which comprises the steps of mixing a chemically resistant mineral filler with 6 to 12% by weight of the total composition of a first stage furfuryl alcohol resin, and a catalyst including at least 3% by weight of the total composition of chlorinated paraffin to form a mixture, molding said mixture under a pressure of at least 2000 pounds per square inch, and curing said mixture, said mineral filler being composed of a chemically resistant mineral aggregate passing through a 16 mesh screen and being retained on a 100 mesh screen and from 25 to 80% by weight of said aggregate of chemically resistant mineral flour, at least 95% of which passes through a 200 mesh screen.

9. The method of producing a dense, chemically resistant structure which comprises the steps of mixing a chemically resistant mineral filler with 6 to 12% by weight of the total composition of a first stage furfuryl alcohol resin, and a catalyst including at least 3% by weight of the total composition of chlorinated paraffin to form a mixture, molding said mixture under a pressure of at least 2000 pounds per square inch, and curing said mixture at a temperature of at least 285° F., said mineral filler being composed of a chemically resistant mineral aggregate passing through a 16 mesh screen and being retained on a 100 mesh screen from 25 to 80% by weight of said aggregate of chemically resistant mineral flour, at least 95% of which passes through a 200 mesh screen.

10. The method of producing a dense, chemically resistant structure which comprises the steps of mixing a mineral filler with 6 to 12% by weight of the total composition of a first stage furfuryl alcohol resin, and a catalyst including at least 3% by weight of the total composition of chlorinated paraffin to form a mixture, molding said mixture under a pressure of at least 2000 pounds per square inch, and curing said resinous mixture, said mineral filler consisting of ground slate passing through a 16 mesh screen and being retained on a 100 mesh screen and from 25 to 80% by weight of said ground slate in the form of slate flour at least 95% of which passes through a 200 mesh screen.

11. The method of producing a dense, chemically resistant structure which comprises the steps of mixing a mineral filler with 6 to 12% by weight of the total composition of a first stage furfuryl alcohol resin, and a catalyst including at least 3% by weight of the total composition of chlorinated paraffin to form a mixture, molding said mixture under a pressure of at least 2000 pounds per square inch, and curing said resinous mixture at a temperature of at least 285° F., said mineral filler consisting of ground slate passing through a 16 mesh screen and being retained on a 100 mesh screen and from 25 to 80% by weight of said ground slate in the form of slate flour at least 95% of which passes through a 200 mesh screen.

12. The method according to claim 7 in which sand is the mineral filler.

13. The method according to claim 7 in which pyrophylite is the mineral filler.

14. The method according to claim 7 in which the furfuryl alcohol contains up to about 15% furfural.

15. The method according to claim 10 in which the furfuryl alcohol contains up to about 15% furfural.

CHARLES G. HARFORD.

References Cited in the file of this patent

UNITED STATES PATENTS

| Number | Name | Date |
|---|---|---|
| Re. 21,252 | Kistler | Oct. 31, 1939 |
| 2,084,534 | Martin | June 22, 1937 |
| 2,333,151 | Campbell | Nov. 2, 1943 |
| 2,399,055 | Nordlander | Apr. 23, 1946 |
| 2,471,600 | Adams et al. | May 31, 1949 |

OTHER REFERENCES

"Diamond Chlorowax," published 1945 by Diamond Alkali Co., Pittsburgh, Pa., pgs. 1–2.